No. 854,757. PATENTED MAY 28, 1907.
J. PEACOCK.
GRAIN CLEANER.
APPLICATION FILED MAR. 15, 1906.
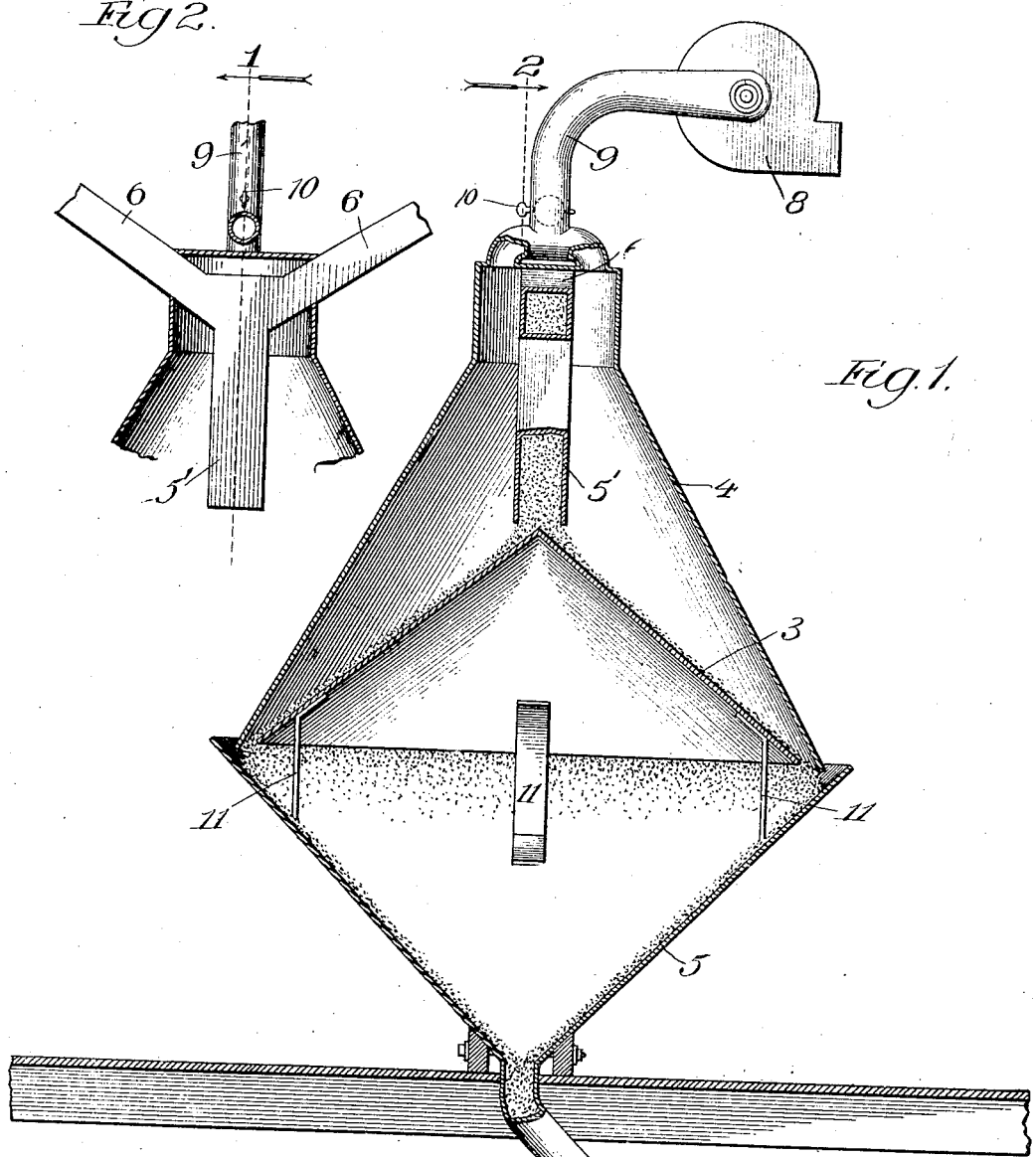
Witnesses
Inventor:
Joseph Peacock
By Attys
Lynnestvedt & Carpenter

UNITED STATES PATENT OFFICE.

JOSEPH PEACOCK, OF SAVANNA, ILLINOIS, ASSIGNOR TO CUPOLA CLEANING COMPANY, OF CHICAGO, ILLINOIS, A CORPORATION OF ILLINOIS.

GRAIN-CLEANER.

No. 854,757.

Specification of Letters Patent.

Patented May 28, 1907.

Application filed March 15, 1906. Serial No. 306,200.

*To all whom it may concern:*

Be it known that I, JOSEPH PEACOCK, a citizen of the United States, residing at Savanna, in the county of Carroll and State of Illinois, have invented certain new and useful Improvements in Grain-Cleaners, of which the following is a specification.

My invention relates to grain cleaners and its objects are, to provide an apparatus of an exceedingly simple and durable construction in which the grain will be rapidly and thoroughly cleaned; to provide an apparatus in which the grain will be cleaned by being subjected, while in motion, to the action of a current of air; to provide an apparatus in which the grain will be caused to flow and spread out in such a way as to permit the current of air to act upon it to the best advantage in order to remove all particles of dust and foreign matter therefrom, and to provide an apparatus which will automatically discharge the cleaned grain into one receptacle and convey the dust etc., removed therefrom to another receptacle, located at a different point, without allowing the escape of any of such dust to the atmosphere while the grain is being cleaned. These objects and other advantages which will hereinafter appear, I attain by means of the construction illustrated in preferred form in the accompanying drawings, wherein—

Figure 1 is a vertical central section of a grain cleaner constructed in accordance with my invention, looking in the direction indicated by the arrow (1) on Figure 2, and Figure 2 is a similar view of the upper part of the hood and its connections, taken at right angles to Figure 1, looking in the direction indicated by the arrow (2) on said figure.

Figure 3 is a detail of a modified edge construction.

It is characteristic of my invention that the grain is spread out in a thin moving sheet, which is subjected to the cleaning action of a current of air, moving in the opposite direction, for some little time, the construction of the apparatus being such that the grain is first met by the current of air at the point where the grain is spread out the most thus allowing the current of air to act to the best advantage to clean the grain. Furthermore the opening for admitting the air is so located with reference to the moving sheet of grain that the current of air while removing every particle of dust etc., from the grain will in no wise interfere with the flow of the latter while it is being cleaned or afterward.

As shown in the drawings, the device is provided with a spreader 3, about which is placed a casing comprising a hood 4 and a hopper 5. The grain is admitted on to the apex of the spreader by means of a spout 5', which extends down adjacent to the apex of the spreader and is in the present instance, as shown in Figure 2, provided with the two feed arms 6. The grain is conducted from the hopper 5 by means of the spout 7 which leads to any desired point. Provision is made for a draft of air through the casing by means of the fan 8 connected to the top of the hood 4 by means of the pipe 9 provided with a regulating damper 10. The hood 4 has its lower edge spaced a slight distance from the upper edge of the hopper 5 to admit the air which is designed to clean the grain as it passes in a thin sheet over the lower edge of the spreader. It will be noted that the lower edge of the spreader is spaced a slight distance above the lower edge of the hood and that the upper edge of the hopper extends a short distance above the lower edge of the hood. This construction provides a more advantageous application of the air to the grain and the overlapping edge of the hopper prevents any spilling of the grain at the juncture of the hood and hopper. The spreader 3 is supported from the hopper by means of the brackets 11. In my preferred form of construction the hood hopper and spreader are all conical in shape which provides for an effective spreading of the grain, an easy conduction thereof from the hopper, and a converging of the dust particles in the hood to the point of outlet by the pipe 9. In operation the grain is conducted by means of the tube 6, 6, to the spout 5 from which it falls on the point of the spreader 3. As the grain approaches the lower edge of the spreader its surface is correspondingly increased and its thickness decreased, so that at the point at which the grain falls from the edge of the spreader to the hopper the layer of grain is of minimum thickness and the current of air induced by the fan 8 and coming in at the air space between the hopper and hood acts to the best advantage on such layer of grain. Furthermore during the progress of the grain down the surface of the spreader the chaff and dust, which is lighter than the grain, is worked somewhat to the top, so that the air coming through the space between the spreader and the hood acts upon that portion of the grain most vigorously and carries practically all of such chaff and dust up through the hood and out through the pipe 9. The provision of the converging hood also serves to direct the air current along the sheet of grain from the bottom edge nearly to the point of the spreader thereby effecting a more perfect cleaning. The spout 5 as shown has its lower end placed close to the point of the spreader to prevent the air current from interfering with the fall of the grain on to the point of the spreader, but it is obvious that this arrangement can be modified by spacing the end of the spout up a distance from the point, in which case the ascending currents of air would clean the grain to a certain extent, but at the same time tend to prevent the stream of grain from flowing as freely as in my preferred arrangement shown.

Figure 3 shows a modification in the lower edge of the hood 4. This modification consists in making the lower edge vertical as shown at 12. The grain falls in a sheet parallel to this vertical edge or band and the air current is caused to flow somewhat closer to the falling grain than with the other form of hood edge.

Having thus described my invention and illustrated its use, what I claim as new and desire to secure by Letters Patent, is the following:

1. In combination, a casing comprising a conical hood and a hopper having their edges slightly separated for the admission of air and with the edge of the hood below the edge of the hopper, a conical spreader having its lower edge free and slightly above the lower edge of the hood, means for admitting grain upon the spreader, means for conducting it out of the hopper, and means for drawing air through the hood.

2. In combination, a casing comprising a conical hood and a hopper having their edges slightly separated and with the hood edge below the edge of the hopper, a hollow conical spreader having its surface at an angle to that of the hood with its lower edge close to the lower edge of the hood but slightly above such hood edge, means for admitting grain upon the spreader, means for conducting it out of the hopper, and means for drawing air through the hood.

3. In combination, a casing comprising a conical hood with a vertical edge 12 and a receiver having its edges spaced a slight distance above the lower extremity of the edge 12, a conical spreader having its lower edge adjacent the upper portion of the edge 12, means for admitting grain upon the spreader, and means for drawing air through the hood.

In testimony whereof I have hereunder signed my name in the presence of the two subscribed witnesses.

JOSEPH PEACOCK.

Witnesses:
S. I. BIRD,
CHESLEY WALTER.